(12) United States Patent
Wehner et al.

(10) Patent No.: US 7,118,126 B2
(45) Date of Patent: Oct. 10, 2006

(54) SIDE AIRBAG DEPLOYMENT SIGNAL ENHANCEMENT

(75) Inventors: Timothy J Wehner, Wyandotte, MI (US); Durgesh M Rege, Farmington Hills, MI (US); Anantha M Malavalli, West Blooomfield, MI (US); Sanjeewa Fonseka, Southfield, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 364 days.

(21) Appl. No.: 10/740,363

(22) Filed: Dec. 18, 2003

(65) Prior Publication Data
US 2005/0093278 A1  May 5, 2005

Related U.S. Application Data

(60) Provisional application No. 60/516,787, filed on Nov. 3, 2003.

(51) Int. Cl.
*B60R 21/16* (2006.01)
(52) U.S. Cl. ................................. 280/735; 180/274
(58) Field of Classification Search ................ 280/735, 280/734, 730.2, 730.1; 180/271, 274
See application file for complete search history.

(56) References Cited

U.S. PATENT DOCUMENTS

| 5,094,034 A | * | 3/1992 | Freeman | 49/501 |
| 5,435,409 A | * | 7/1995 | Meyer et al. | 180/274 |
| 5,544,716 A | * | 8/1996 | White | 180/274 |
| 5,793,005 A | * | 8/1998 | Kato | 200/61.45 R |

* cited by examiner

*Primary Examiner*—Faye M. Fleming
(74) *Attorney, Agent, or Firm*—Ralph E. Smith

(57) ABSTRACT

A vehicle safety system includes a door beam having a first end and second end, and a load transfer element disposed proximate the first end of the door beam. In addition, an airbag sensor is disposed proximate the load transfer element, whereby the load transfer element is operable to receive a load from the door beam and transfer the load to the airbag sensor.

20 Claims, 7 Drawing Sheets

SIDE AIRBAG DEPLOYMENT SIGNAL ENHANCEMENT

This application claims the benefit of U.S. Provisional Application Ser. No. 60/516,787 filed Nov. 3, 2003.

FIELD OF THE INVENTION

The present invention relates to side airbag systems, and more particularly, to an improved side airbag system with an enhanced deployment signal.

BACKGROUND OF THE INVENTION

Modern vehicle safety systems commonly include a variety of devices such as seat belts and airbags. Such systems are commonly designed to work together with sensors and other structural elements such as door beams, side sill sections, and body panels.

In one such safety system, a side airbag is utilized in conjunction with vehicle structure to protect an occupant in the event of a side impact collision. In such an impact, side airbags are designed to deploy when a predetermined dynamic load is applied to the side of the vehicle. The timing of the airbag's deployment should be controlled so as to function properly with the other safety components.

To ensure proper timing of an airbag system, an airbag sensor is typically utilized to detect a dynamic load experienced by a vehicle and to send a deployment decision signal to the airbag. For a side airbag system, the airbag sensor is commonly disposed in the structure of the vehicle, such as in a support pillar. The airbag sensor evaluates system conditions such as acceleration and velocity resulting from a dynamic load applied to the vehicle and determines whether or not to deploy the airbag. If the system conditions meet a predetermined criteria, the system will cause the airbag to deploy.

Conversely, airbag sensors are also operable to prevent deployment of the airbag when the system responses conditions do not meet the criteria, such as when the vehicle experiences a low speed impact. To prevent deployment of an airbag during a low speed impact, conventional airbag sensors are commonly disposed within the vehicle such that the vehicle outer structure must deform a predetermined amount before sending a signal to an airbag sensor.

While these conventional systems adequately prevent deployment of an airbag under a low speed impact, such systems typically suffer from the disadvantage of causing an undesirable delay in the deployment of the airbag under a high speed or high load impact, due to the airbag sensor being disposed within a structure of the vehicle.

Therefore, a vehicle safety system designed with structural intent for reliable and immediate deployment of an airbag following a high speed impact event while concurrently preventing deployment of the airbag under a low speed impact event in a consistent manner is desirable in the industry.

SUMMARY OF THE INVENTION

A vehicle safety system includes a door beam having a first end and second end, with a load transfer element disposed proximate the first end of the door beam. An airbag sensor is disposed proximate the load transfer element, whereby the load transfer element is operable to receive a load from the door beam and transfer the load to the airbag sensor.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
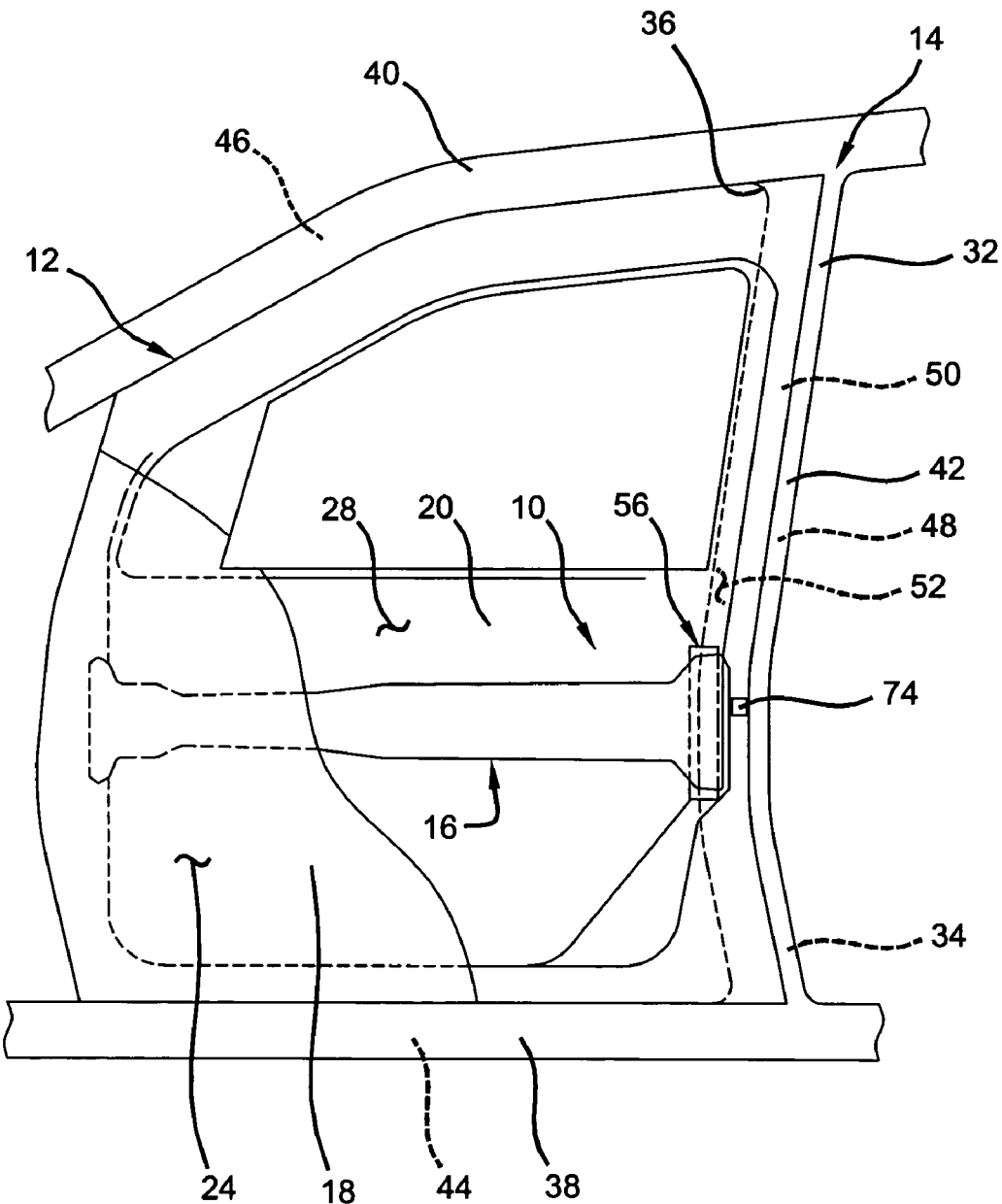
FIG. 1 is a side view of a door assembly incorporating a safety system in accordance with the principals of the present invention.
Figure 2:
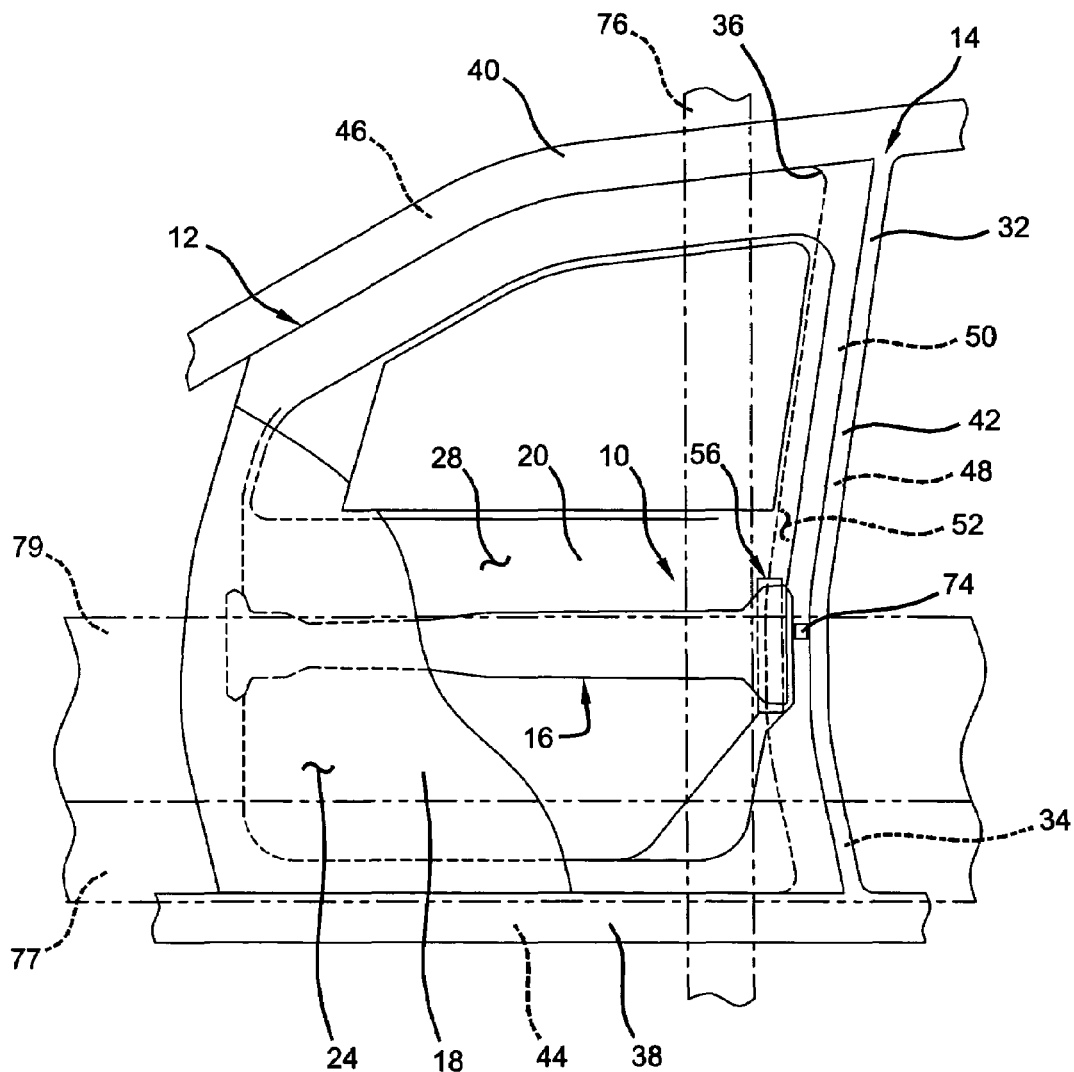
FIG. 2 is a side view of the door assembly of FIG. 1 showing a first and second test fixture in relation to the safety system of FIG. 1.

With reference to the figures, a vehicle safety system 10 is provided and includes door assembly 12, a side aperture assembly 14, and a door beam 16. The side aperture assembly 14 operably supports the door assembly 12 such that the door assembly 12 generally overlaps the side aperture assembly 14, as best shown in FIGS. 1 and 2. The door beam 16 is fixedly supported by the door assembly 12 and is operable to transmit a dynamic load from the door assembly 12 to the side aperture assembly 14, as will be discussed further below.

Figure 3:
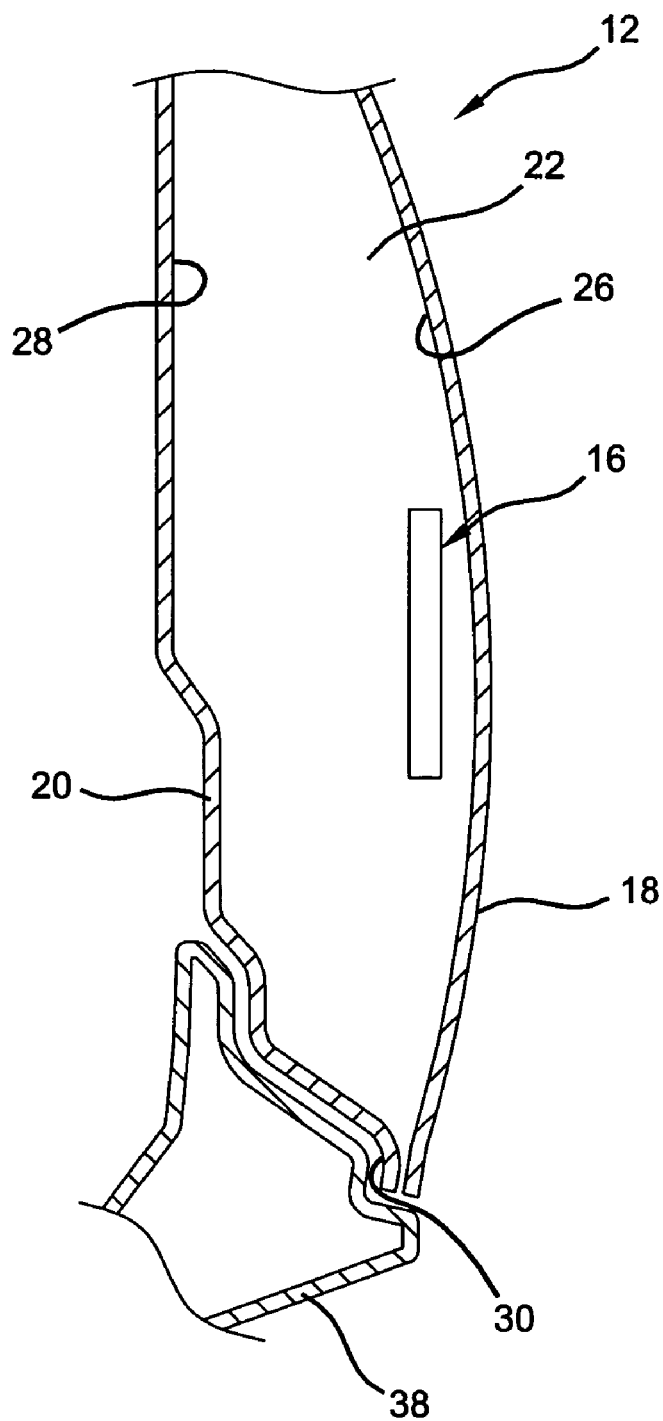
FIG. 3 is a cross-sectional view of the door assembly of FIGS. 1 and 2.

As best shown in FIG. 3, the door assembly 12 includes an outer panel 18 fixedly attached to an inner panel 20 such that an interior space 22 is formed therebetween. The outer panel 18 includes a generally arcuate outer surface 24 and inner surface 26 while the inner panel 20 includes a generally planar inner surface 28. The interior space 22 is generally defined between the inner surface 26 of the outer panel 18 and the planar surface 28 of the inner panel 20. The door assembly 12 further includes a flange 30 extending around a perimeter of the door assembly 12. The flange 30 is operable to engage the side aperture assembly 14, as will be discussed further below.

The side aperture assembly 14 includes an inner panel 32 and an outer panel 34. The inner and outer panels 32, 34 cooperate to form a door opening 36, whereby the door opening 36 is operable to rotatably support the door assembly 12. The door opening 36 is framed by a sill 38 extending along a bottom portion of the door assembly 12, a header 40 running along a top portion of the door assembly, and a B-pillar 42 extending generally between the sill 38 and the header 40, as best shown in FIG. 1. As can be appreciated, the inner and outer panels 32, 34 form a respective interstitial space 44, 46, 48 in each of the sill 38, header 40, and B-pillar 42. In this manner, the flange 30 of the door assembly 12 is operable to engage each of the sill 38, header 40, and B-pillar 42 when the door assembly 12 is in a closed position.

The B-pillar 42 includes a reaction surface 50 extending along its length for interaction with the flange 30 of the door assembly 12. Specifically, the reaction surface 50 generally mimics a contour of the flange 30 such that the outer surface 24 of the outer panel 18 is substantially flush with an outer surface 52 of the B-pillar 42 when the door assembly 12 is in the closed position. In this manner, the flange 30 is generally in contact with the reaction surface 50 of the B-pillar 42 between the header 40 and sill 38, as best shown in FIGS. 1 and 2.

As previously discussed, the side aperture assembly 14 rotatably supports the door assembly 12. In this regard, the door assembly 12 is adapted to be selectively engaged with the side aperture assembly 14 to selectively secure the door assembly 12 in the closed position. To that end, the B-pillar 42 includes a striker assembly 54 for selective engagement with a door latch mechanism 56 mounted on the door assembly 12 such that when the striker assembly 54 is operably connected to the latch mechanism 56, the door assembly 12 is held in the closed position.

Figure 5:
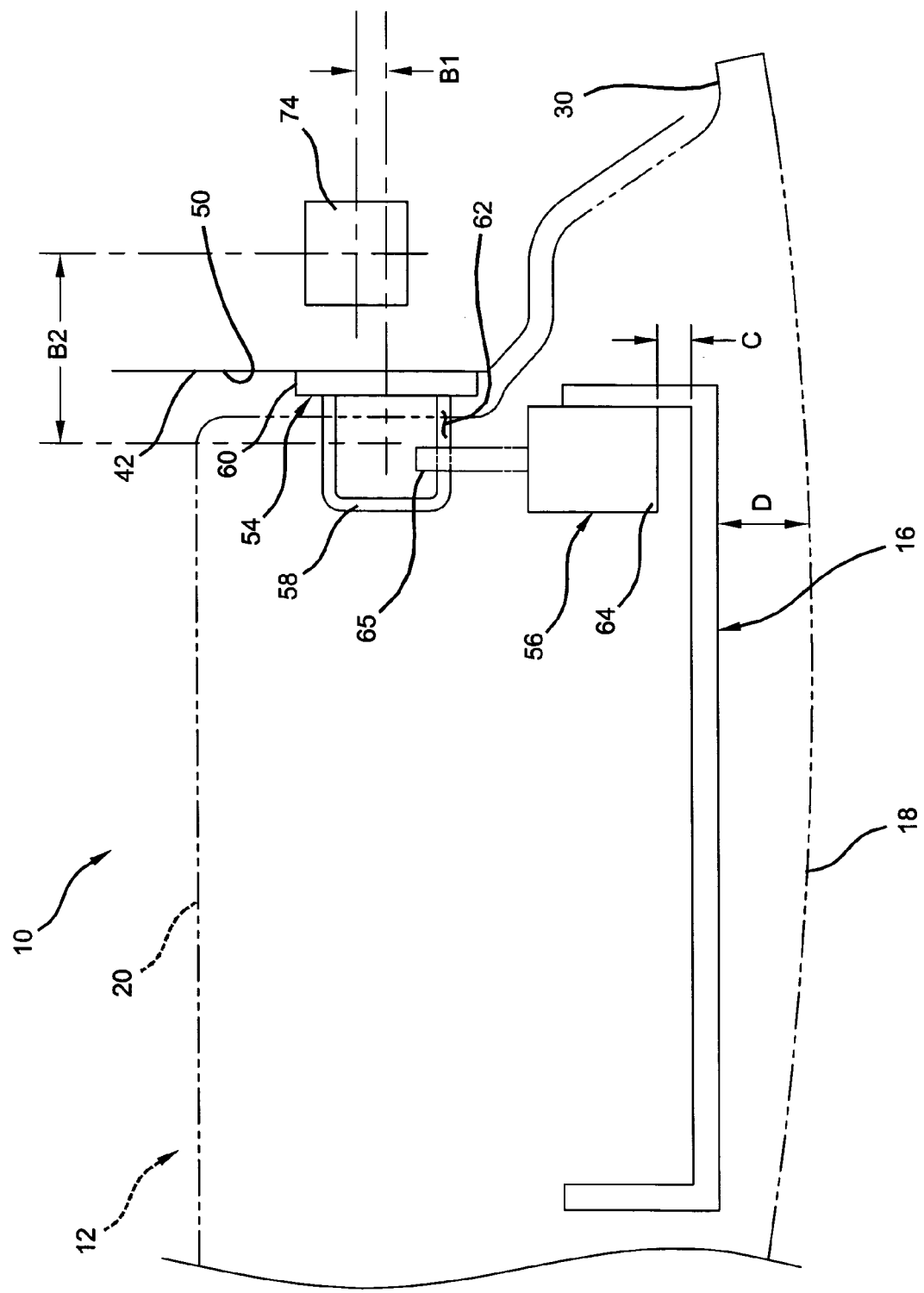
FIG. 5 is a top view of the safety system of FIGS. 1 and 2.

As best shown in FIG. 5, striker assembly 54 is fixedly supported by the B-pillar 42 and includes a striker 58 and an attachment plate 60. The striker 58 is fixedly supported by the attachment plate 60 and includes an engagement surface 62. The attachment plate 60 is mounted in proximity to the reaction surface 50 such that the striker 58 is positioned for selective engagement with the latch mechanism 56.

The latch mechanism 56 is fixedly supported within the interior space 22 of the door assembly 12 and is operable to selectively engage the striker 58 at the engagement surface 62 to latch or hold the door assembly 12 in the closed position relative to the side aperture assembly 14. The latch mechanism 56 includes a generally rigid outer frame 64 and a latch plate 65. The latch plate 65 is operable to engage the striker 58 such that movement between the latch mechanism 56 and the striker 58 is restricted, as shown in FIG. 5.

Figure 4:
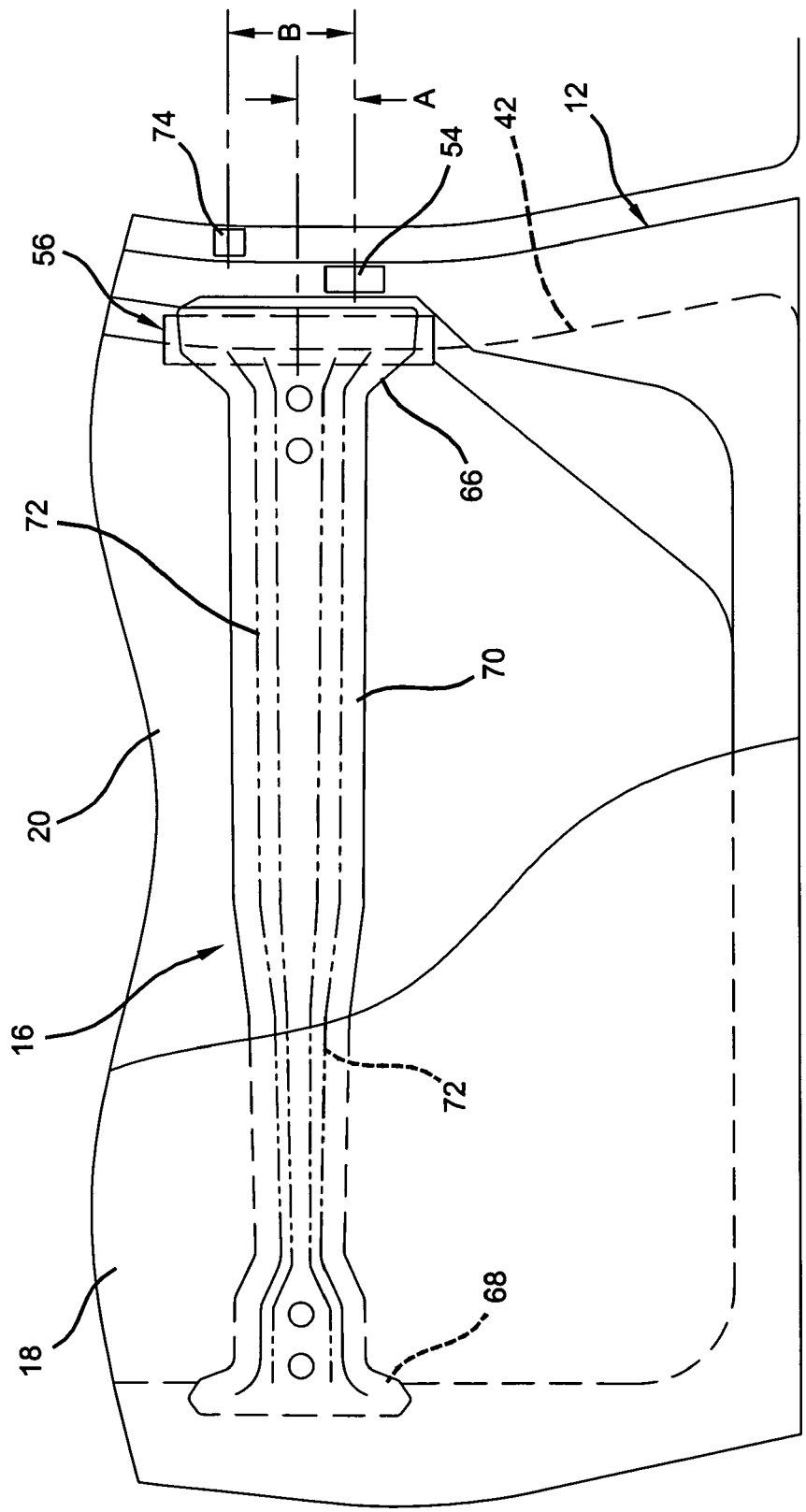
FIG. 4 is a side view of a door beam in accordance with the principals of the present invention.

As best shown in FIG. 4, door beam 16 is disposed within the interior space 22 of the door assembly 12 and includes a proximate end 66, a distal end 68, and a main body 70 extending between the proximate and distal ends 66, 68. The main body 70 includes a series of ribs 72 to increase the resistance to bending of the door beam 16. In addition, the main body 70 is tapered from the distal end 68 to the proximate end 66. More particularly, the main body 70 includes a taper which increases in width from distal end 68 to the proximate end 66. As can be appreciated, such a relationship increases the overall strength and stiffness of the door beam 16 and thus improves the overall performance of the safety system 10.

The door beam 16 is positioned within the interior space 22 of the door assembly 12, generally proximate the inner surface 26 of the outer panel 18, as best shown in FIG. 3. In addition, the proximate end 66 is positioned in close proximity to the door latch mechanism 56 such that a dynamic load applied to the door beam 16 is quickly transmitted to the door latch mechanism 56 and striker assembly 54, as will be discussed further below. As can be appreciated, the proximate end 66 of the door beam 16 is concurrently positioned near the striker assembly 54 as the striker assembly 54 is positioned near the door latch mechanism 56, as previously discussed and shown in FIGS. 2 and 5.

As previously discussed, the proximate end 66 of the door beam 16 is positioned within the interior space 22 of the door assembly 12 in close proximity to the door latch mechanism 56 and striker assembly 54. In that regard, a dynamic load applied to the door assembly 12 will be quickly transmitted from the outer panel 18 to the B-pillar 42, via the door beam 16, door latch mechanism 56, and striker assembly 54.

An airbag sensor 74 is positioned proximate the striker assembly 54 such that the dynamic load transmitted from the outer panel 18 is quickly received and analyzed by the sensor 74. Specifically, as the outer panel 18 receives a dynamic load from an external source, such as a Federal Motor Vehicle Safety Standard (hereinafter "FMVSS") 201 pole fixture 76 (FIG. 6), the dynamic load is quickly received by the airbag sensor 74 via the door beam 16, latch mechanism 56, and striker assembly 54. The door beam 16, latch mechanism 56, and striker assembly 54 provide a load path from the outer panel 18 to the B-pillar 42 such that minimal deformation of door assembly 12 and side aperture assembly 14 is realized prior to the airbag sensor 74 receiving a transmitted signal. In this manner, the sensor 74 is able to quickly send a fire signal to an airbag (not shown) prior to significant deformation of both the door assembly 12 and side aperture assembly 16, thereby improving the overall performance of the safety system 10.

Figure 6:
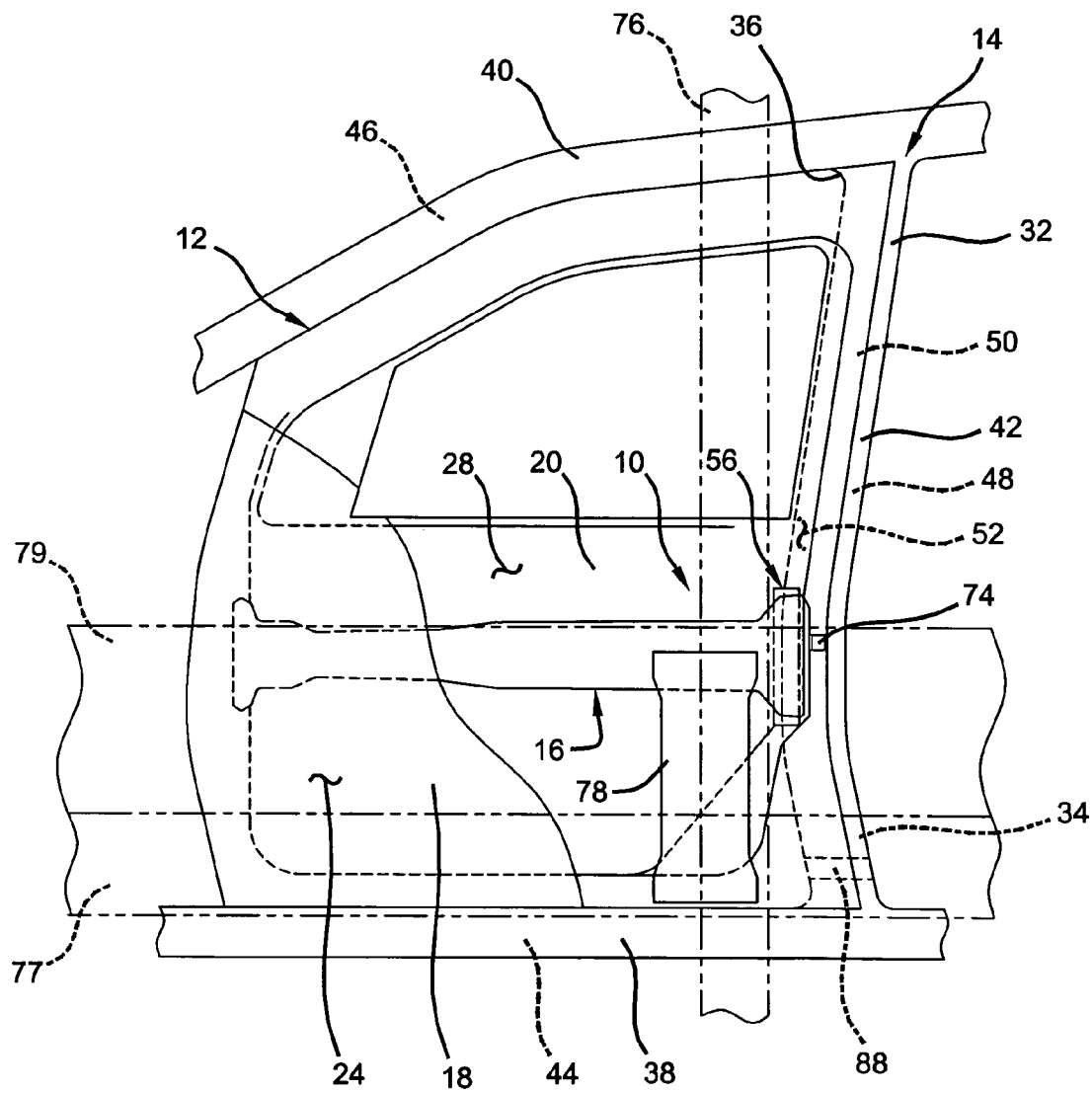
FIG. 6 is a side view of a door assembly incorporating a second embodiment of a safety system in accordance with the principals of the present invention showing a first and second test fixture in relation to the safety system.

With reference to FIG. 6, it should be understood that the relationship between the door beam 16, door latch mechanism 56, striker assembly 54, and airbag sensor 74 is such that under a low speed impact event using a standard FMVSS 214 barrier 79 and accompanying bumper form 77, a load from the bumper form 77 is not transmitted to the airbag sensor 74. For example, the position of a FMVSS 214 bumper form 77 is such that a load applied to the outer panel 18 will not be transmitted to the door latch mechanism 56 and striker assembly 54, and thus, will not be transmitted to the B-pillar 42 and airbag sensor 74. In this manner, the safety system 10 is adapted to improve the timing of the airbag sensor 74 without creating a situation whereby minor or low speed events cause the sensor 74 to deploy an airbag. Conversely, with high-speed side impact events at speeds generally greater than 33.5 MPH, an impactor, such as a FMVSS 214 barrier 79 will easily provide enough load to be transmitted to the B-pillar 42 and airbag sensor 74, resulting in a timely airbag deployment.

With reference to FIG. 4, the relationship between the proximate end 66 of the door beam 16, door latch mechanism 56, and striker assembly 58 is shown in greater detail. FIG. 4 represents a side view depicting an acceptable range for which the door beam 16 should be positioned relative to the door latch mechanism 56 such that the door beam 16 includes a 100% overlap with door latch mechanism 56 in side view projection. In addition, FIG. 4 further depicts a desired relative position between the door latch mechanism 56, the striker assembly 54, and air bag sensor 74 to achieve an acceptable load path from the outer panel 18 to the airbag sensor 74.

The relative position between the striker 54 and the door latch mechanism 56 is defined by the letter A, whereby A has an outer limit value of 25 mm and an ideal value of 0 mm. The relative position between the striker assembly 54 and the airbag sensor 74 is defined by the letter B, whereby B has an outer limit value of 130 mm and an ideal value of 0 mm. In this regard, the ideal position of the striker assembly 54, latch mechanism 56, and airbag sensor 74 would be such that both A and B have a value of 0 mm.

FIG. 5 is a top view depicting desired relative spatial relationship between the door beam 16, door latch mechanism 56, striker assembly 54, and airbag sensor 74 to achieve an acceptable load path, as previously discussed. The relative position between the striker 54 and the airbag sensor 74 is defined by the letters B1 and B2, whereby B1 has an outer limit value of 50 mm and B2 has an outer limit value of 52 mm. The relative position between the door beam 16 and the latch mechanism 56 is defined by the letter C, whereby C has an outer limit value of 19 mm. In addition, the relationship between the door outer panel 18 and the door beam 16 is defined by the letter D, whereby D has an outer limit value of 6 mm. It should be noted that D is measured generally at the position at which the pole 76 contacts the outer panel 18.

As can be appreciated, an ideal condition is one in which a dynamic load applied to the outer surface 24 of the outer panel 18 is directly and instantaneously received by the airbag sensor 74 such as an airbag sensor 74 being positioned inline with pole 76 on surface 26 of door outer panel 18 such that the airbag can be immediately deployed. In most situations, however, packaging and functional concerns require that the load path for a given external dynamic load be offset as best shown in FIG. 2. By positioning the door beam 16, door latch mechanism 56, and striker assembly 54 in close proximity to the airbag sensor 74, an acceptable load path may be achieved, as previously discussed. Specifically, the door beam 16 should have 100% overlap with the door latch mechanism 56, as best shown in FIG. 4. In addition, the barrier 79 should overlap the door beam 16 such that the barrier 79 contacts at least 75% of the door beam 16 to enhance system performance by reducing intrusion under high-speed impact events.

In certain situations, the door beam 16 cannot be positioned in closed proximity to the outer panel 18 due to the generally curved nature of the panel 18. In such a situation, it is more difficult to quickly transmit a load to an airbag sensor 74 due to the required deformation of the outer panel 18 before the inner surface 26 of panel 18 contacts the door beam 16 and transmits the associated load. In such situations, other reinforcements are utilized to further strengthen the door assembly 12 and side aperture assembly 14 to establish an improved load path, thereby reducing the time in which the airbag sensor 74 receives the acceleration signal from a high-speed load.

Figure 7:
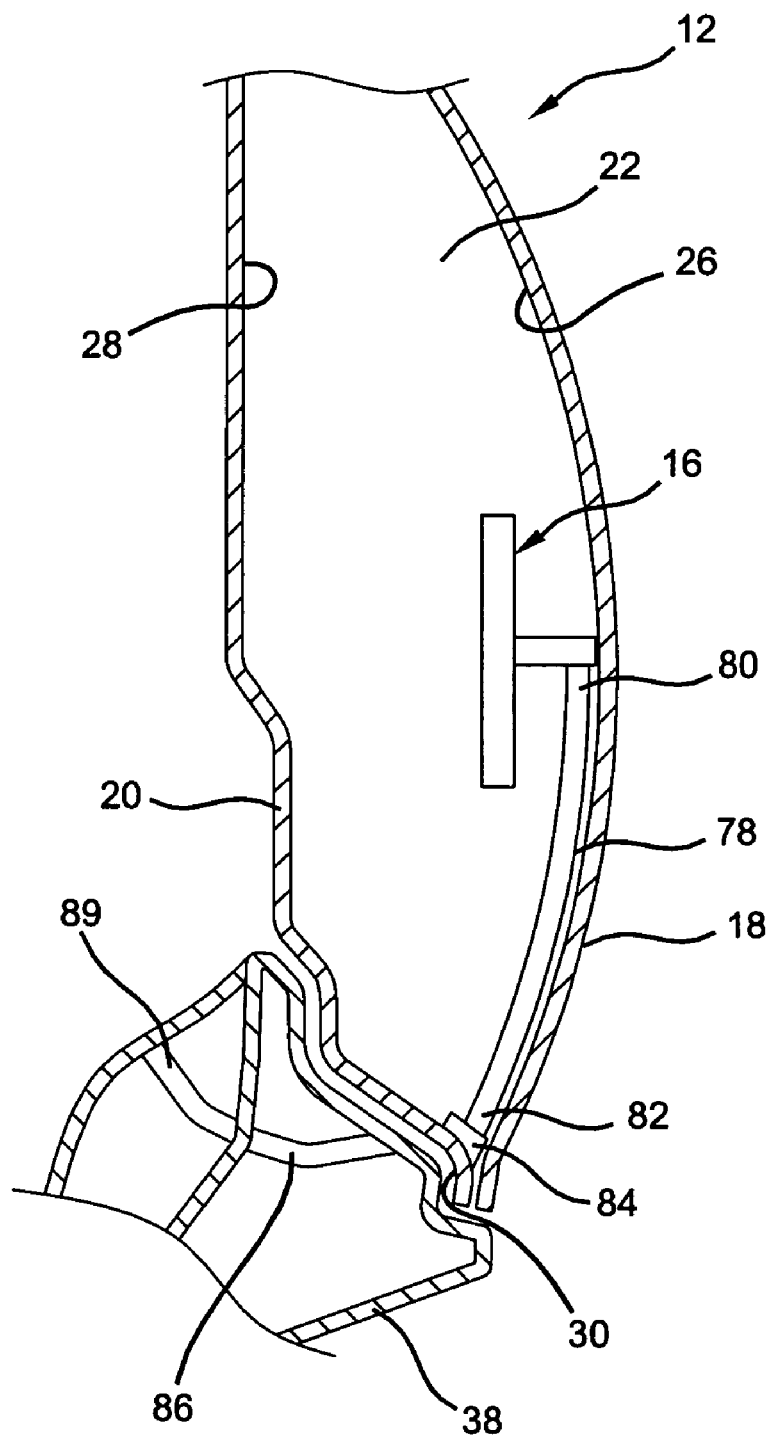
FIG. 7 is a cross-sectional view of the door assembly of FIG. 6 and accompanying vehicle structure.

As best shown in FIG. 7, a reinforcement bracket 78 may be added to the door beam 16, whereby the bracket 78 better mimics the arcuate shape of the door outer panel 18. The reinforcement bracket 78 is fixedly attached to the proximate end 66 of the door beam 16 at a first end 80 and fixedly attached near a bottom portion of the door assembly 12 at a second end 82 via a support bracket 84. In this manner, any dynamic load applied to the outer panel 18 will be nearly instantaneously applied to the reinforcement bracket 78 and thus to the door beam 16. As previously discussed, application of a dynamic load to the door beam 16 allows the dynamic load to be quickly transmitted to the airbag sensor 74 via the door latch mechanism 56 and striker assembly 54.

To further enhance the performance of the reinforcement bracket 78, a pair of sill gussets 86, 89 may be added to the sill 38 to locally strengthen the sill 38 and inhibit deformation, while a pillar gusset 88 (FIG. 6) may be added to the B-pillar 42 to further reinforce the side aperture assembly 14 and enhance the load path between the outer panel 18 of the door assembly 12 and the airbag sensor 74. As can be appreciated, the foregoing reinforcement bracket 78 and gussets 86, 88 function independently of one her and are added to enhance the performance of the safety system 10. As such, a particular safety system 10 and in consideration of predetermined test fixture or a test fixture position relative to a door assembly or side aperture assembly should be tailored to include only those components that are necessary to achieve a desired load path.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle safety system comprising:
 a door beam having a first end and second end, said door beam extending along a first longitudinal axis;
 a load transfer element disposed proximate said first end of said door beam;
 an airbag sensor disposed proximate said load transfer element;
 wherein said load transfer element is operable to receive a load from said door beam and transfer said load to said airbag sensor.

2. The vehicle safety system of claim 1 wherein said load transfer element comprises a door latch mechanism.

3. The vehicle safety system of claim 1 wherein said load transfer element comprises a striker assembly.

4. The vehicle safety system of claim 1 wherein said second end of said door beam includes a greater width than said first end of said door beam, said width measured in a direction generally perpendicular to said first longitudinal axis.

5. A vehicle safety system comprising:
 a beam extending along a first longitudinal axis;
 a bracket extending from said beam along a second longitudinal axis, said bracket including a first end fixed to said beam and a second end extending therefrom;
 a first load transfer element disposed proximate said beam and said first end of said bracket, said first load transfer element operable to transmit a load along a third longitudinal axis;
 a second load transfer element disposed adjacent said second end of said bracket, said second load transfer element operable to transmit a load along said third longitudinal axis; and
 first and second reinforcement gussets, said first and second reinforcement gussets flanking said second end of said bracket and operable to transmit a load along said third longitudinal axis.

6. The vehicle safety system of claim 5 wherein said beam is positioned within 19 mm of said first load transfer element, along said third longitudinal axis.

7. The vehicle safety system of claim 5 wherein said first load transfer element is a latch mechanism.

8. The vehicle safety system of claim 5 further comprising an airbag sensor, said airbag sensor disposed adjacent said second reinforcement gusset along said third longitudinal axis.

9. The vehicle safety system of claim 5 wherein said third longitudinal axis is generally perpendicular to said first longitudinal axis.

10. The vehicle safety system of claim 5 wherein said bracket includes a reaction surface extending between said first and second end, said reaction surface operable to transmit a load to said beam and said second load transfer element via said first and second ends.

11. The vehicle safety system of claim 10 wherein said reaction surface includes a strengthening rib extending along its length between said first and second ends.

12. A vehicle body including:
a side aperture assembly including:
a B-pillar having an inner panel and an outer panel;
a door assembly hingedly supported by said side aperture assembly, said door assembly including an inner panel fixedly attached to an outer panel;
a door beam fixedly attached to said door assembly between said inner and outer panels, said door beam including a first end and second end;
a load transfer element disposed proximate said first end of said door beam; and
an airbag sensor disposed proximate said load transfer element;
wherein said load transfer element is operable to receive a load from said door outer panel and said door beam and transfer said load to said airbag sensor.

13. The vehicle body of claim 12 further comprising a reinforcement bracket extending from said door beam proximate said first end, said reinforcement bracket substantially mimicking a shape of the door outer panel.

14. The vehicle body of claim 13 wherein said arcuate surface of said reinforcement bracket is adjacent an inner surface of said door outer panel.

15. The vehicle body of claim 12 wherein said airbag sensor is fixedly attached to said B-pillar, said airbag sensor positioned within 50 mm of said load transfer element in a first direction and within 52 mm of said load transfer element in a second direction, said first direction generally perpendicular to said beam and said second direction generally parallel to said beam.

16. The vehicle body of claim 12 wherein said airbag sensor is disposed proximate said load transfer element.

17. The vehicle body of claim 12 further comprising a sill integrally formed with said body side aperture assembly, said sill including a first and second gusset.

18. The vehicle body of claim 12 wherein said load transfer element is a door latch mechanism, said door latch mechanism operable to transmit a dynamic load applied to said door inner panel.

19. The vehicle body of claim 12 wherein said load transfer element is a striker assembly, said striker assembly fixedly attached to said B-pillar.

20. The vehicle body of claim 12 wherein said B-pillar includes a reinforcement gusset disposed between said inner and outer panels.

* * * * *